US006549827B1

(12) United States Patent
Yen

(10) Patent No.: US 6,549,827 B1
(45) Date of Patent: Apr. 15, 2003

(54) FIRE PREVENTION AUTOMATION COMMANDING CONTROL SYSTEM USING SATELLITE-LOCATION/GEOGRAPHY-INFORMATION

(76) Inventor: John Yen, No. 12, 9F-5, Chung-Hwa Rd., Young-Kang City, Tainan Hsien (TW)

( * ) Notice: Subject to any disclaimer, the term of this patent is extended or adjusted under 35 U.S.C. 154(b) by 330 days.

(21) Appl. No.: 09/716,701

(22) Filed: Nov. 20, 2000

(51) Int. Cl.[7] .......................... A62C 2/00; G08G 1/123; H04Q 7/20

(52) U.S. Cl. .......................... 700/282; 700/19; 700/21; 700/79; 700/80; 169/60; 169/61; 455/456

(58) Field of Search .......................... 700/282, 19, 21, 700/79, 80; 169/60, 61; 455/456

(56) References Cited

U.S. PATENT DOCUMENTS

| | | | | |
|---|---|---|---|---|
| 2,359,573 A | * 10/1944 | MacKay | ...................... | 169/36 |
| 4,666,105 A | * 5/1987 | Dellinger et al. | ............. | 244/63 |
| 5,503,350 A | * 4/1996 | Foote | ......................... | 244/1 R |
| 5,507,350 A | * 4/1996 | Primlani | ...................... | 169/47 |
| 5,794,889 A | * 8/1998 | Bailey | ........................ | 244/136 |
| 5,878,819 A | * 3/1999 | Denoize et al. | ............... | 169/53 |
| 5,959,423 A | * 9/1999 | Nakanishi et al. | ..... | 318/568.12 |
| 6,364,026 B1 | * 4/2002 | Doshay | ...................... | 169/47 |
| 2001/0036832 A1 | * 11/2001 | McKay | ....................... | 455/456 |
| 2002/0084918 A1 | * 7/2002 | Roach | ........................ | 340/988 |

* cited by examiner

*Primary Examiner*—John A. Follansbee
*Assistant Examiner*—Thomas Pham
(74) *Attorney, Agent, or Firm*—Bucknam and Archer

(57) ABSTRACT

The prevent invention provides a fire prevention automation commanding control system using satellite-location/geography-information, which uses a central processing computer to integrate radio transmission, satellite location, geography information, facility control, image monitoring, underground piping control, piping monitoring, mobile/stationary communication, and a fire detection alarm device into an integrated fire prevention system performing automatic command, control, communication, information processing and on-site evidence collection, i.e., so-called C31 system, so that it is possible to rapidly detect fire and effectively command and control the rescue operation.

2 Claims, 2 Drawing Sheets

FIRE PREVENTION AUTOMATION COMMANDING CONTROL SYSTEM USING SATELLITE-LOCATION/GEOGRAPHY-INFORMATION

FIELD OF THE INVENTION

The present invention relates to a fire prevention automation commanding control system using satellite-location/geography-information, and in particular to a fire prevention automation commanding control system uses a central processing computer to integrate radio transmission, satellite location, geography information, facility control, image monitoring, underground piping control, piping monitoring, mobile/stationary communication, and a fire detection alarm device into an integrated fire prevention system performing automatic command, control, communication, information processing, i.e., so-called C31 system.

BACKGROUND OF THE PRESENT INVENTION

At present, there are increasing counts of fire caused by gas (nature gas, liquid petroleum, and the like) explosion, improper use of electrical equipment, or arson, and it frequently results in tremendous loss of life and property simply due to usually delayed report to the police. With today's high tech development, things get even worse because people often neglect disaster prevention measure due to their busy life. However, there is no such system available in the market that provides a well-facilitated fire prevention command/control system performing simultaneous fire evidence searching, prevention, and self-alarming. Therefore, it is necessary to utilize a central processing unit (CPU) and software programming to develop a system integrating radio transmission principle, satellite location technology, and systems such as geography information, facility control, image monitoring, underground piping control, piping monitoring, mobile/stationary communication and a common detection alarm, which is capable of automatic commanding, controlling, communication, and information processing. With such system, it is possible to effectively avoid or greatly reduced above disasters.

SUMMARY OF THE INVENTION

Therefore, it is an object of present invention is to provide a fire prevention automation commanding control system using satellite-location/geography-information, which uses a central processing computer to integrate radio transmission, satellite location, geography information, facility control, image monitoring, underground piping control, piping monitoring, mobile/stationary communication, and a fire detection alarm device into an integrated fire prevention system performing automatic command, control, communication, and information processing. With such system, it is possible to make a rapid detection of fire and suppress the occurrence or expansion of fire in time as well as perform first time evidence searching and effectively command/control rescue operation.

To achieve above object, a fire prevention automation commanding control system using satellite-location/geography-information is provided, including:

- a indoor safety automatic detection/cut-off system having:
  - a plurality of radio signal detectors/transmitters, which detect gas, flame, smoke, and carbon monoxide respectively, and automatically generate detection signals and transmit radio signals;

- a plurality of radio-signal camera/receiver, which receive radio-signals transmitted by at least one of said plurality of radio-signal detectors/transmitters and activate a radio-signal camera/receiver corresponding to said at least one of the radio-signal detectors/transmitters;
- a central controller, which receives a detection signal generated by said at least one of the radio-signal detectors/transmitters and generates a control signal; and
- a gas self cut-off device, which automatically cut-off the supply of gas according to said control signal generated by said central controller;
- a subscriber-end system automatic communication device having:
  - a power supply, which supplies electricity;
  - a radio-signal receiver, which receives radio-signals transmitted by at least one of said plurality of radio-signal detectors/transmitters;
  - an input/output device, which is connected to said radio-signal receiver so as to input/output said radio-signals;
  - a central processing unit, which is connected to said input/output device so as to process said radio-signals and generate data;
  - a random access memory, which provides information required by said central process unit and store data generated by said central process unit;
  - a multi-frequency auto-dial telephone/circuit, which automatically dial according to said input/output device by means of signals and data provided by said central process unit and said random access memory;
  - an image compression/control device, which controls and compresses image signals outputted by said camera and transfers them to said multi-frequency auto-dial telephone/circuit;
  - a device for fire-department operation command center having:
    - an image decompression and video recording device, which decompresses image signals inputted from above output of camera;
    - a central processing unit, which processes data and image signals outputted by said multi-frequency auto-dial telephone/circuit and generates a telephone-confirm signal as well as the analytic data of the whole system;
    - a subscriber management device, which manages and stores data associated with subscribers;
    - an electronic map device of geography information, which provides geography information required by associate electronic map;
    - a database, which stores data of underground piping including gas and electricity;
    - an underground piping self-monitoring device, which controls cut-off operation of said underground piping; and
    - a communication system interface processing device, which is coupled via a RS-232 interface to said central process unit as well as a VHF/UHF radio control device, a satellite receiving device, a satellite communication device, data mobile communication device, and a satellite location vehicle commanding device.

Furthermore, in the fire prevention automation commanding control system using satellite-location/geography-information according to present invention, said communication system interface processing device is also coupled to a device for ambulance, a device for fire engine, a device for patrolling vehicle, a device for piping unit rescue vehicle, and a device for mobile commanding vehicle, wherein:

said device for ambulance has a satellite location navigation command/control device, a mobile communication device, and a medical affairs control device;

said device for fire engine has a satellite-location navigation command/control device, a mobile communication device, and a fire prevention operation command/control device;

said device for patrolling vehicle has a satellite location navigation command/control device, a mobile communication device, and a police operation command/control device;

said device for piping unit rescue vehicle has a satellite location navigation command/control device, a mobile communication device, and a geography information piping management device;

said device for mobile commanding vehicle has a satellite location navigation command/control device, a mobile communication device, a police command/control device, and a geography information inquiring device.

BRIEF DESCRIPTION OF DRAWINGS

The above and other objects, features, and advantages of present invention will become more apparent from the detailed description in conjunction with the following drawings, in which.

DETAILED DESCRIPTION OF THE INVENTION

Figure 1:
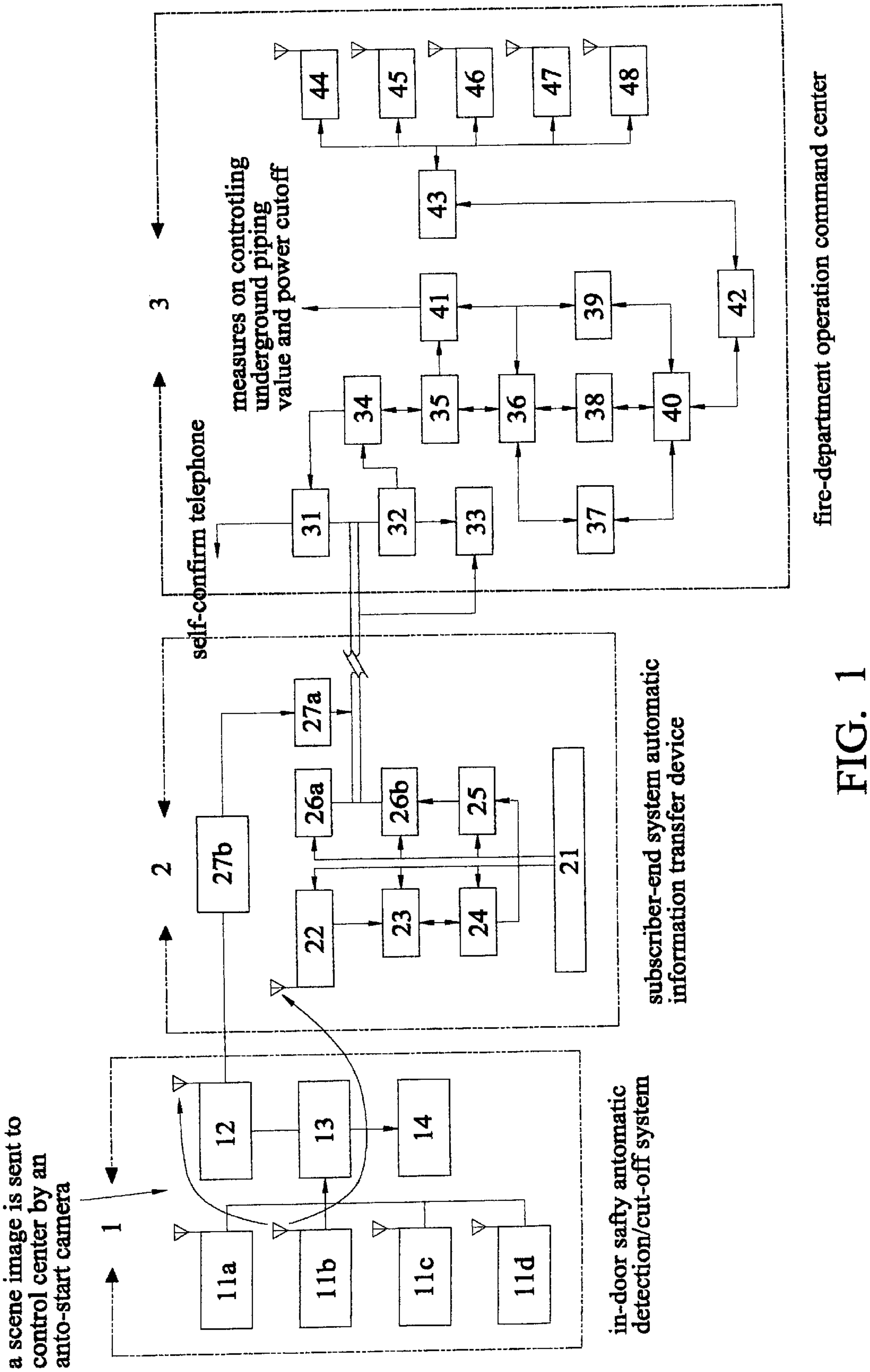
FIG. 1 is a block diagram schematically showing fire prevention automation commanding control system using satellite-location/geography-information in accordance with present invention.
Figure 2:
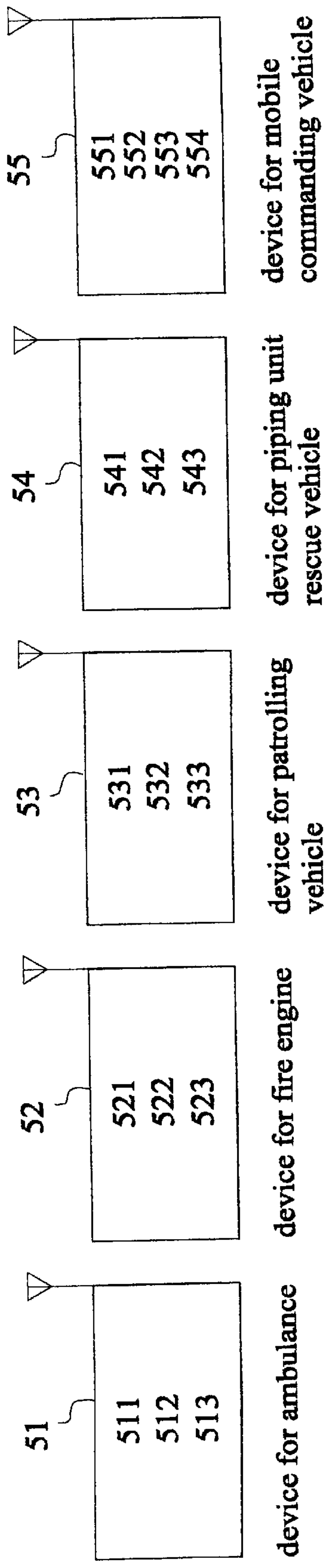
FIG. 2 exemplifies a device for vehicle arranged in accordance with present invention.

As shown in FIG. 1, a fire prevention automation commanding control system using satellite-location/geography-information according to present invention is equipped with a indoor safety automatic detection/cut-off system 1, a subscriber-end system automatic communication device 2, and a device for fire-department operation command center 3. Said indoor safety automatic detection/cut-off system 1 comprises: a plurality of radio signal detectors/transmitters 11, which detect gas at 11*a*, flame at 11*b*, smoke at 11*c*, and carbon monoxide at 11*d* respectively, and automatically generate detection signals for a central controller 13 and transmit radio signals; a plurality of radio-signal camera/receiver 12, which receive radio-signals transmitted by at least one of said plurality of radio-signal detectors/transmitters 11 (11*a*, 11*b*, 11*c*, and 11*d*) and activate a radio-signal camera/receiver 12 corresponding to said at least one of the radio-signal detectors/transmitters 11; a central controller 13, which receives a detection signal generated by said at least one of the radio-signal detectors/transmitters and generates a control signal; and a gas self cut-off device, which automatically cut-off the supply of gas according to said control signal generated by said central controller. Said subscriber-end system automatic communication device 2 comprises: a power supply 21, which supplies electricity; a radio-signal receiver 22, which receives radio-signals transmitted by at least one of said plurality of radio-signal detectors/transmitters 11; an input/output device 23, which is connected to said radio-signal receiver 22 so as to input/output said radio-signals to/from a central processing unit 24; a central processing unit 24, which is connected to said input/output device 23 so as to process said radio-signals and generate data; a random access memory 25, which provides information required by said central process unit 24 and store data generated by said central process unit 24; a multi-frequency auto-dial telephone/circuit (26*a*, 26*b*) which automatically dials according to said input/output device 23 by means of signals and data provided by said central process unit 24 and said random access memory 25; an image compression/control device (27*a*, 27*b*), which controls and compresses image signals outputted by said camera 12 and transfers them through said multi-frequency auto-dial telephone/circuit (26*a*, 26*b*) to a device for fire-department operation command center 3.

Said device for fire-department operation command center 3 comprises: an image decompression and recording device 33, which is connected to multi-frequency auto-dial circuit (31, 32) and decompresses image and video signals inputted from above output of camera; a central processing unit 34, which processes data and image signals outputted by said multi-frequency auto-dial telephone/circuit (26*a*, 26*b*, 31, 32) and generates a telephone-confirm signal as well as the analytic data, said telephone-confirm signal is then transferred to said multi-frequency auto-dial telephone/circuit 26*a* of said subscriber-end system automatic communication device 2, while said analytic data is transferred to a integration interface 36 and a underground piping self-monitoring device 41 through a operation system 35 of said central processing unit 34, respectively; a subscriber management device 37, which is connected to said integration interface 36 and provide data associated with subscribers such as address and piping arrangement to said central processing unit 34 and a system integration interface 40 in accordance with said analytic data of said central processing unit 34; a electronic map device of geography information 38, which is connected to said integration interface 36 and provides an electronic map representing geography spatial information to said central processing unit 34 and a system integration interface 40 in accordance with said analytic data of said central processing unit 34; a database 39, which is connected to said integration interface and provides underground piping arrangement data such as underground petroleum, gas, electricity, water resource to said central processing unit 34 and a system integration interface 40 in accordance with necessity generated according to said analytic data of said central processing unit 34 and geography information of said electronic map device 38; an underground piping self-monitoring device 41, which controls cut-off operation of underground piping such as underground petroleum, gas, electricity in accordance with said analytic data of said central processing unit 34 and said underground piping arrangement of said database; and a communication system interface processing device 43, which is coupled via a RS-232 interface 42 to said central process unit 34 as well as a VHF/UHF radio control device 44, a satellite receiving device 45, a satellite communication device 46, data mobile communication device 47, and a satellite location vehicle commanding device 48. Said communication system interface processing device 43 can also be coupled to devices for vehicle such as ambulance 51, fire engine 52, patrol vehicle (include traffic control vehicles)

53, piping unit rescue vehicle 54, and mobile commanding vehicle 55. Said device for ambulance has a satellite-location navigation command/control device 511, a mobile communication device 512, and a medical affairs control device 513; said device for fire engine 52 has a satellite location navigation command/control device 521, a mobile communication device 522, and a fire prevention operation command/control device 523; said device for patrolling vehicle 53 has a satellite location navigation command/control device 531, a mobile communication device 532, and a police operation command/control device 533; said device for piping unit rescue vehicle 54 has a satellite location navigation command/control device 541, a mobile communication device 542, and a geography information piping management device 543; said device for mobile commanding vehicle 55 has a satellite location navigation command/control device 551, a mobile communication device 652, a police command/control device 553, and a geography information inquiring device 554.

As described above, said indoor safety automatic detection/cut-off system 1 according to present invention is a major portion of prevention and alarming in the system. Detectors (11*a*, 11*b*, 11*c*, 11*d*) use here must pass the standard inspection of associate regulation, should there be any leakage of gas or in case of fire detected and the alarm be activated, the system will immediately cut-off the supply of gas. It is very likely that people are in panic, thought someone else has already report to the police, or cannot remember relevant phone numbers, or too busy on getting out to report the event, determined to commit suicide, so that by the time passerby did report to the police and the fire fighters had arrived the scene it will be too late for first time rescue. Therefore, the present invention has incorporated a device for MDTF (multi-frequency auto-dial telephone) and developed said subscriber-end system automatic communication device 2 such that whenever detectors (11*a*, 11*b*, 11*c*, 11*d*) have been activated, it will then automatically send a message to said device for fire-department operation command center 3. Furthermore, the present invention has also designed a self-confirm telephone and a mistake prevention design to avoid faulty report of a fire.

In addition, said device for fire-department operation command center 3 is the core of the system, whose functions includes:

(1) When a disaster alarm signal is transferred in through a public communication line, said device 3 will automatically detects the identification code and immediately retrieve and display the subscriber's fundamental data such as name, phone number, and address.

(2) The policemen on duty need only push a button and said device 3 will automatically call back said system of a preset phone number to confirm the actual situation.

(3) At the time the policeman on duty pushed the button, said device 3 will automatically incorporate with geography information system 38 to show an electronic map of target area.

(4) By means of said geography information system 38, it is possible for the system to show information associated with subscribers such as neighboring fire hydrant (water resource), nearby hospital, unit and quantity of ambulance, best way to access, traffic control routing, road block position, option of mobile commanding site position, and condition of underground piping, etc.

(5) After the disaster is confirmed, said device will rapidly command fire, engine 52, ambulance 51, and backup force 53 to the scene through a police operation communication device.

(6) Mobil vehicle such as fire engine 52, ambulance 51, and backup force 53 may rapidly get to the scene by making use of satellite-location self-navigation device.

(7) Backup force and fire engine from outside district can also get to the scene and find water resource through said satellite-location self-navigation device.

(8) Said operation command/control center 3 can use a satellite-location commanding system to know the position of all vehicles involving the rescue and directly command the operation.

(9) People in the utility facilities such as gas company, electricity company, petroleum company, and telecommunication company may corporate to reduce the damage to a minimum scale.

(10) Said system has stored data associated with all residencies and regulated business within the district or community.

(11) Said satellite-location navigation command/control device used in present system can handle at least 2000 specific target simultaneously.

It is understood that present invention is not limited to above description and is allowed to have various modification and change, however, the spirit and scope of present invention is considered to fall within claims as following.

LIST OF REFERENCE NUMERALS

1 indoor safety automatic detection/cut-off system
11*a* gas detector/raid signal transmitter
11*b* flame detector/radio signal transmitter
11*c* smoke detector/radio signal transmitter
11*d* carbon monoxide detector/radio signal transmitter
12 digital camera+radio receiver
13 central controller
14 gas auto-cut-off value device
2 subscriber-end system automatic communication device
21 power supply
22 radio signal receiver
23 input/output device
24 CPU
25 RAM
26*a* multi-frequency automatic telephone
26*b* auto-dial crime reporting circuit
27*a* image compressing device
27*b* image control device
3 fire-department operation command center
31 multi-frequency auto-dial circuit Tx
32 multi-frequency auto-dial circuit Rx
33 image decompression & recording device
34 control processing computer
35 operation system
36 system integration interface
37 subscriber management device
38 geographic information device/electronic map
39 data base
40 system integration interface
41 underground piping self-monitoring system
42 RS-232 interface
43 communication interface processing device
44 V/UHF radio control device
45 satellite receiving device
46 satellite communication device
47 data mobile communication device
48 satellite locating vehicle commanding device
51 device for ambulance
511 satellite location navigation command/control device
512 mobile communication device
513 medical affairs control device

52 device for fire engine
521 satellite location navigation command/control device
522 mobile communication device
523 fire prevention operation command/control device
53 device for patrolling vehicle
531 satellite location navigation command/control device
532 mobile communication device
533 police operation command/control device
54 device for piping unit rescue vehicle
541 satellite location navigation command/control device
542 mobile communication device
543 geography information piping management device
55 device for mobile commanding vehicle
551 satellite location navigation command/control device
552 mobile communication device
553 police command/control device
554 geography information inquiring device

What is claimed is:

1. A fire prevention automation commanding control system using satellite-location/geography-information, comprises:

a indoor safety automatic detection/cut-off system having:

a plurality of radio signal detectors/transmitters, which detect gas, flame, smoke, and carbon monoxide respectively, and automatically generate detection signals and transmit radio signals;

a plurality of radio-signal camera/receiver, which receive radio-signals emitted by at least one of said plurality of radio-signal a detectors/transmitters and activate a radio-signal camera/receiver corresponding to said at least one of the radio-signal detectors/transmitters;

a central controller, which receives a detection signal generated by said at least one of the radio-signal detectors/transmitters and generates a control signal; and a gas self cut-off device, which automatically-cut-off the supply of gas according to said control signal generated by said central controller;

a subscriber-end system automatic communication device having:

a power supply, which supplies electricity;

a radio-signal receiver, which receives radio-signals transmitted by at least one of said plurality of radio-signal detectors/transmitters;

an input/output device, which is connected to said radio-signal receiver so as to input/output said radio-signals;

a central processing unit, which is connected to said input/output device so as to process said radio-signals and generate data;

a random access memory, which provides information required by said central process unit and store data generated by said central process unit;

a multi-frequency auto-dial telephone/circuit, which automatically dial according to said input/output device by means of signals and data provided by said central process unit and said random access memory;

an image compression/control device, which controls and compresses image signals outputted by said camera and transfers them to said multi-frequency auto-dial telephone/circuit;

a device for fire-department operation command center having:

an image compression and recording/control device, which decompresses image and video signals inputted from above output of camera;

a central processing unit, which processes data and image signals outputted by said multi-frequency auto-dial telephone/circuit and generates a telephone-confirm signal as well as the analytic data of the whole system;

a subscriber management device, which manages and stores data associated with subscribers;

an electronic map device of geography information, which provides geography information required by associate electronic map;

a database, which stores data of underground piping including gas and electricity;

an underground piping self-monitoring device, which controls cut-off operation of said underground piping; and a communication system interface processing device, which is coupled via a RS-232 interface to said central process unit as well as a VHF/UHF radio control device, a satellite receiving device, a satellite communication device, data mobile communication device, and a satellite location vehicle commanding device.

2. The fire prevention automation commanding control system using satellite-location/geography-information as set forth in claim 1, in which said communication system interface processing device can also be coupled to devices for vehicle such as ambulance, fire engine, patrol vehicle (include traffic control vehicles), piping unit rescue vehicle, and mobile commanding vehicle, wherein:

said device for ambulance has a satellite location navigation command/control device, a mobile communication device, and a medical affairs control device;

said device for fire engine has a satellite-location navigation command/control device, a mobile communication device, and a fire prevention operation command/control device;

said device for patrolling vehicle has a satellite location navigation command/control device, a mobile communication device, and a police operation command/control device;

said device for piping unit rescue vehicle has a satellite location navigation command/control device, a mobile communication device, and a geography information piping management device;

said device for mobile commanding vehicle has a satellite location navigation command/control device, a mobile communication device, a police command/control device, and a geography information inquiring device.

* * * * *